(12) United States Patent
Schroeder et al.

(10) Patent No.: US 12,441,302 B1
(45) Date of Patent: Oct. 14, 2025

(54) SYSTEM AND METHOD FOR PRE-COLLISION ADJUSTMENTS IN VEHICLES

(71) Applicant: UIPCO, LLC, San Antonio, TX (US)

(72) Inventors: Eric David Schroeder, San Antonio, TX (US); Donnette L. Moncrief Brown, San Antonio, TX (US); Snehal Desai, Richardson, TX (US); Manfred Amann, San Antonio, TX (US); Timothy Frank Davison, San Antonio, TX (US); Rachel Michelle Ballew, San Antonio, TX (US); Kelsey Anne O'Brien, Austin, TX (US); Sayeef Rahim, Allen, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 315 days.

(21) Appl. No.: 18/059,537

(22) Filed: Nov. 29, 2022

Related U.S. Application Data

(60) Provisional application No. 63/284,052, filed on Nov. 30, 2021.

(51) Int. Cl.
*B60W 30/09* (2012.01)
*B60T 7/22* (2006.01)
*B60T 8/171* (2006.01)
*B60W 10/04* (2006.01)
*B60W 10/18* (2012.01)
*B60W 10/20* (2006.01)
*B60W 50/00* (2006.01)

(52) U.S. Cl.
CPC ............ *B60W 30/09* (2013.01); *B60T 7/22* (2013.01); *B60T 8/171* (2013.01); *B60W 10/04* (2013.01); *B60W 10/18* (2013.01); *B60W 10/20* (2013.01); *B60W 50/0097* (2013.01); *B60T 2210/32* (2013.01); *B60T 2220/00* (2013.01); *B60T 2260/02* (2013.01); *B60T 2270/89* (2013.01); *B60W 2554/404* (2020.02); *B60W 2710/18* (2013.01); *B60W 2720/106* (2013.01); *B60W 2720/24* (2013.01)

(58) Field of Classification Search
None
See application file for complete search history.

(56) References Cited

U.S. PATENT DOCUMENTS

| | | | |
|---|---|---|---|
| 2019/0071084 A1* | 3/2019 | Tuncali | B60W 30/165 |
| 2021/0300306 A1* | 9/2021 | Costin | B60T 7/22 |

* cited by examiner

*Primary Examiner* — Luke Huynh
(74) *Attorney, Agent, or Firm* — Plumsea Law Group, LLC

(57) ABSTRACT

A system and method for modifying one or more vehicle control systems in a target vehicle prior to a collision with an approaching vehicle are disclosed. The system and method include detecting that a collision is imminent and controlling one or more vehicle control systems automatically to change the impact duration and/or location, depending on the type of collision detected.

20 Claims, 8 Drawing Sheets

SYSTEM AND METHOD FOR PRE-COLLISION ADJUSTMENTS IN VEHICLES

CROSS-REFERENCE TO RELATED APPLICATIONS

This application claims the benefit of Provisional Patent Application No. 66/284,052 filed Nov. 30, 2021, and titled "System and Method for Pre-Collision Adjustments in Vehicles," which is incorporated by reference herein in its entirety.

TECHNICAL FIELD

The present disclosure generally relates to motor vehicles, and in particular to vehicle control systems.

BACKGROUND

Motor vehicles may include automatic braking systems that can automatically slow or stop a moving vehicle that is in danger of colliding into another vehicle. These systems can be used to help prevent, for example, rear-end collisions. However, these systems cannot be readily employed by stopped vehicles, or vehicles that are otherwise in danger of being hit by an approaching vehicle.

There is a need in the art for a system and method that addresses the shortcomings discussed above.

SUMMARY

In one aspect, a method of adjusting a vehicle braking system in a target vehicle, where the target vehicle includes a collision adjustment system, includes steps of receiving, at the collision adjustment system, information about an approaching vehicle from one or more vehicle sensors, where the information about the approaching vehicle includes at least an approaching vehicle speed and an approaching vehicle orientation, receiving, at the collision adjustment system, information about any forward obstacles to the target vehicle, determining, from the information about the approaching vehicle, if a rear-end collision between the approaching vehicle and the target vehicle is substantially unavoidable, and determining if there are any forward obstacles to the target vehicle. Upon determining that a rear-end collision is substantially unavoidable between the target vehicle and the approaching vehicle, and that there are no forward obstacles to the target vehicle, the method further comprises automatically decreasing the braking force being applied by the vehicle braking system.

In another aspect, a method of adjusting one or more vehicle control systems in a target vehicle, the target vehicle further including a collision adjustment system, includes steps of receiving, at the collision adjustment system, information about an approaching vehicle from one or more vehicle sensors and determining, from the information about the approaching vehicle, if a side impact collision between the approaching vehicle and the target vehicle is substantially unavoidable and determining a predicted impact location. The method also includes determining if the predicted impact location is associated with a passenger area of the target vehicle. Upon determining that the side impact collision is substantially unavoidable between the target vehicle and the approaching vehicle, and that the predicted impact location is associated with the passenger area of the target vehicle, the method further comprises automatically accelerating the target vehicle.

In another aspect, a method of adjusting one or more vehicle control systems in a target vehicle, the target vehicle further including a collision adjustment system, includes steps of receiving, at the collision adjustment system, information about an approaching vehicle from one or more vehicle sensors and determining, from the information about the approaching vehicle, if a side impact collision between the approaching vehicle and the target vehicle is substantially unavoidable and determining a predicted impact location. The method also includes determining if the predicted impact location is associated with a passenger area of the target vehicle. Upon determining that the side impact collision is substantially unavoidable between the target vehicle and the approaching vehicle, and that the predicted impact location is associated with the passenger area of the target vehicle, the method further comprises automatically turning the target vehicle away from the approaching vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods for proactively adjusting one or more vehicle control systems prior to an imminent collision. These proactive adjustments may help reduce the magnitude of impact forces, as well as the impact location between an approaching vehicle and a target vehicle.

Figure 1:
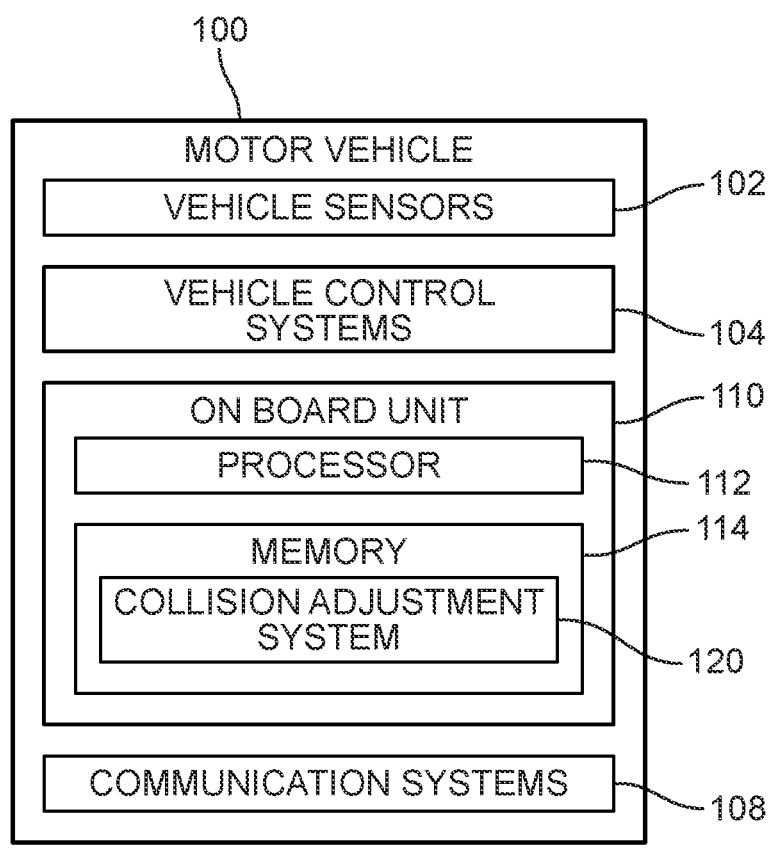
FIG. 1 is a schematic view of a motor vehicle, including various systems and components, according to an embodiment.

FIG. 1 is a schematic view of a motor vehicle 100 that may include various components and systems. Referring to FIG. 1, vehicle 100 may include one or more vehicle sensors 102. Vehicle sensors 102 could be used to detect information about the state of the vehicle and/or information about the external environment. The external environment may include other vehicles.

As used herein the "state" of a vehicle can include, but is not limited to: the vehicle speed, acceleration, location, and orientation. The state of a vehicle may also include the presence of one or more vehicle control systems. For example, the state of a vehicle could include that the vehicle has an automatic braking system, and/or the status of the automatic braking system (activated or deactivated).

Vehicle 100 may also include one or more vehicle control systems 104. As used herein, the term "vehicle control system" may refer to various systems related to acceleration, braking, steering, and other suitable systems.

Vehicle 100 may also include one or more communication systems 108. Using communication systems 108, vehicle 100 could receive information from external networks (such as cellular networks, Wi-Fi networks, or other suitable wireless networks). In some cases, vehicle 100 could communicate with nearby vehicles using communication systems 108. For example, vehicle 100 could communicate with other vehicles through a Vehicle-To-Vehicle network.

Vehicle 100 may further include an onboard unit (OBU) 110. OBU 110 can be a computing system that further includes at least one processor 112, as well as memory 114. Memory 114 can be used to store instructions that can be executed by the at least one processor 112.

In some embodiments, memory 114 may store one or more programs that comprise a collision adjustment system 120. Collision adjustment system 120 may be configured to adapt the operation of one or more vehicle control systems 104 in response to information from vehicle sensors 102, and/or from other suitable sources. In particular, as described in further detail below, collision adjustment system 120 may be configured to make pre-collision adjustments to various systems of the vehicle in order to minimize damage and/or the force of impact during a collision.

Figure 2:
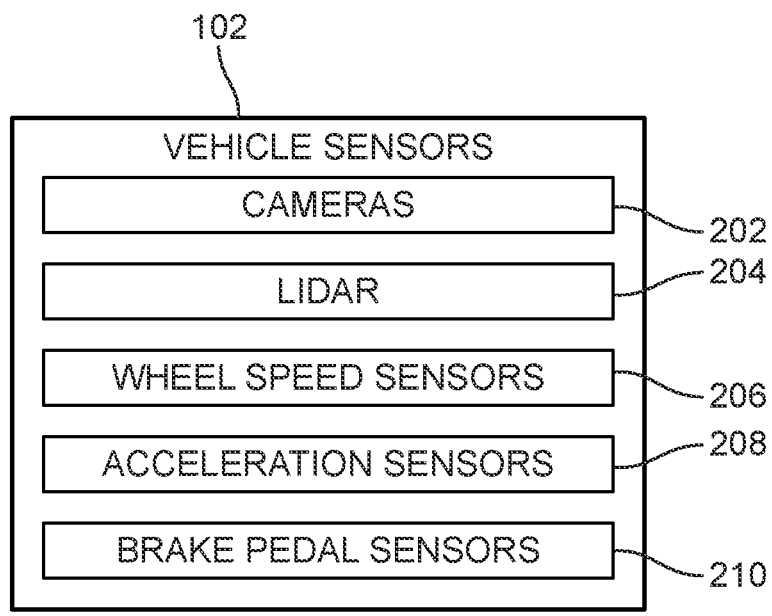
FIG. 2 is a schematic view of a set of vehicle sensors, according to an embodiment.

FIG. 2 is a schematic view of some exemplary vehicle sensors that could be incorporated into vehicle 100 as part of vehicle sensors 102. Exemplary sensors that may be used include, but are not limited to: cameras 202, Light Detection and Ranging sensors 204 ("LIDAR 204"), wheel speed sensors 206, acceleration sensors 208, and brake pedal sensors 210. Cameras could be rear facing, front facing, and/or sideways facing.

Figure 3:
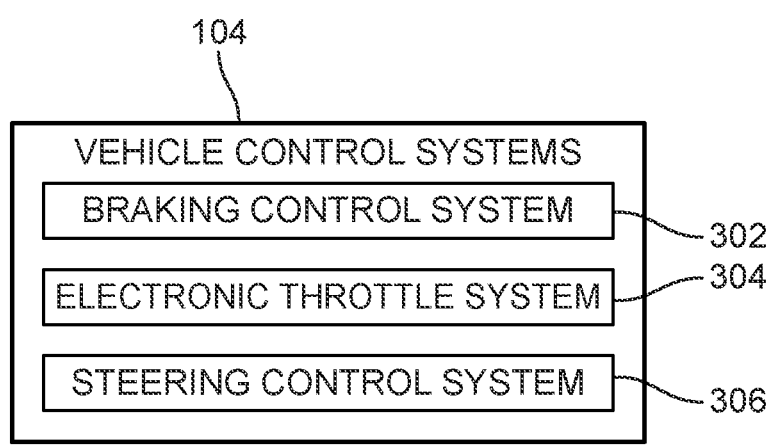
FIG. 3 is a schematic view of a set of vehicle control systems, according to an embodiment.

FIG. 3 is a schematic view of some exemplary vehicle control systems 104 that may be used for operating vehicle 100. Exemplary control systems that may be used include, but are not limited to: a braking control system 302, an electronic throttle control system 304, and a steering control system 306. For example, braking control system 302 could be used to adjust the braking force applied to the wheels. This control can be coordinated with the motion of a brake pedal, or could be done independently and without manual input from the driver. Likewise, electronic throttle control system 304 could be used to adjust the acceleration of a vehicle. This control can be coordinated with the motion of an accelerator pedal, or could be done independently without manual input from the driver. Steering control system 306 could be used to adjust the steering of the vehicle. This control can be coordinated with the motion of a steering wheel, or could be done independently without manual input from the driver.

Figure 4:
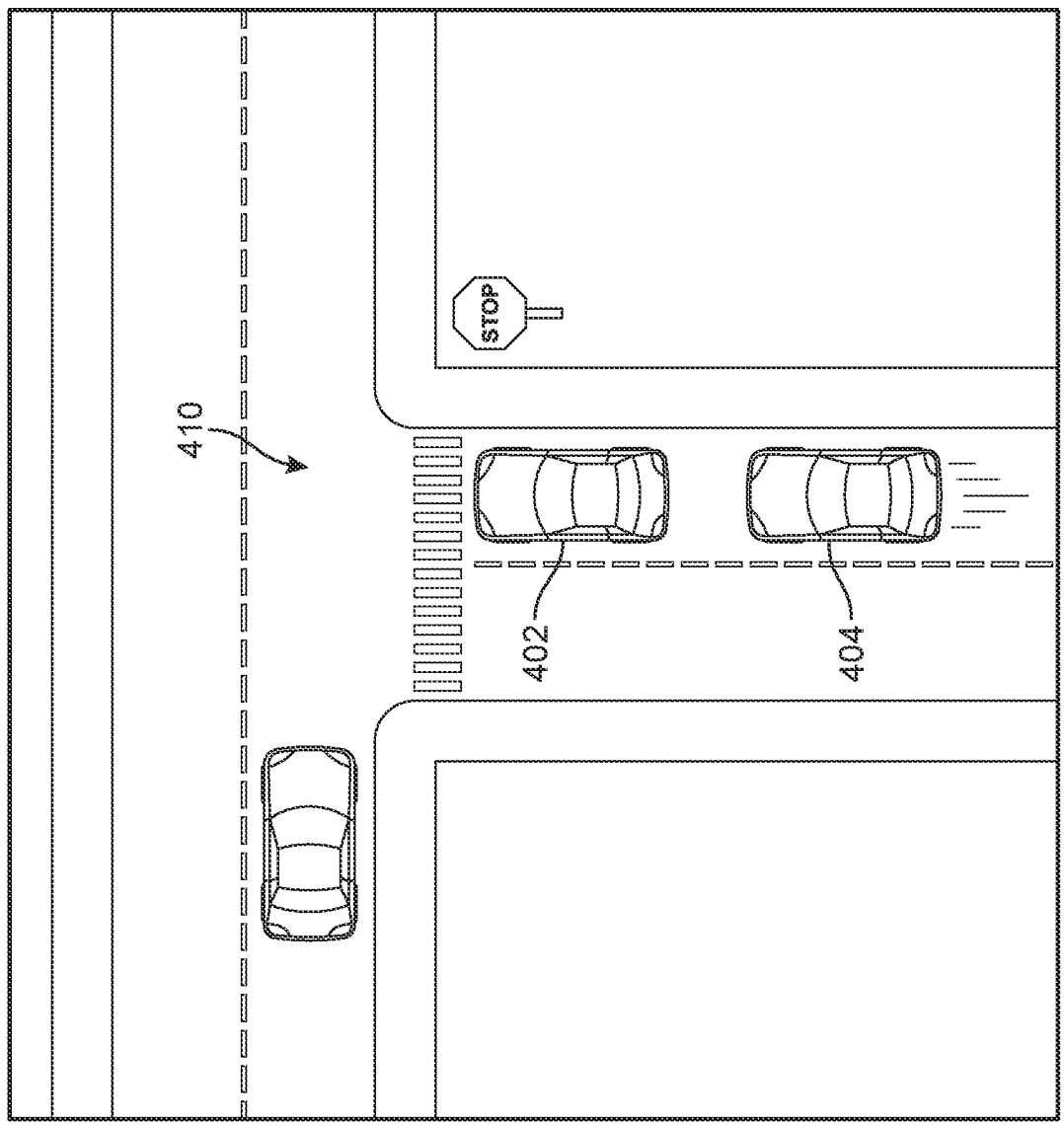
FIG. 4 is a schematic view of a scenario in which a target vehicle may be hit by an approaching vehicle from behind, according to an embodiment.

For purposes of clarity the embodiments make reference to a "target vehicle" and an "approaching vehicle" that may be involved in a collision. As used herein, a target vehicle is a vehicle that may be impacted by another vehicle, which is generally traveling at greater speed, or otherwise directed towards the target vehicle during a collision. As an example, FIG. 4 shows a configuration of a target vehicle 402 prior to a rear end collision with an approaching vehicle 404. In this example, target vehicle 402 is stopped at an intersection 410. Approaching vehicle 404 is unable to slow down and/or stop sufficiently quickly to avoid the rear end collision.

Generally, an approaching vehicle may have one or more collision avoidance systems, such as an automatic braking system that is activated to slow down the approaching vehicle before it collides with the target vehicle. However, these systems may not always be useful for a target vehicle. For example, the target vehicle in a collision is often traveling significantly slower than the approaching vehicle, so that automatic braking by the target vehicle may do little to change the outcome of an imminent collision. Moreover, in many cases, such as rear-end collisions, a driver of the target vehicle is already applying a braking force prior to the collision.

In these embodiments, a target vehicle can include a collision adjustment system that can be used to proactively adjust the state of the target vehicle prior to a collision. These adjustments may minimize potential damage during a collision that may be unavoidable.

In the case of an imminent rear-end collision, in which the target vehicle cannot avoid being rear-ended by the approaching vehicle, a collision adjustment system may take automatic actions to increase the duration of the collision, thereby reducing the average impact forces experienced by the vehicles, and any occupants in the vehicles. In some embodiments, the duration of the collision can be increased by reducing the braking force applied by the target vehicle. With the braking force of the target vehicle decreased, the target and approaching vehicles may travel further while colliding, thereby prolonging the duration of the collision. Prolonging the duration of the collision will tend to decrease the average impact forces experienced throughout the collision.

Figure 5:
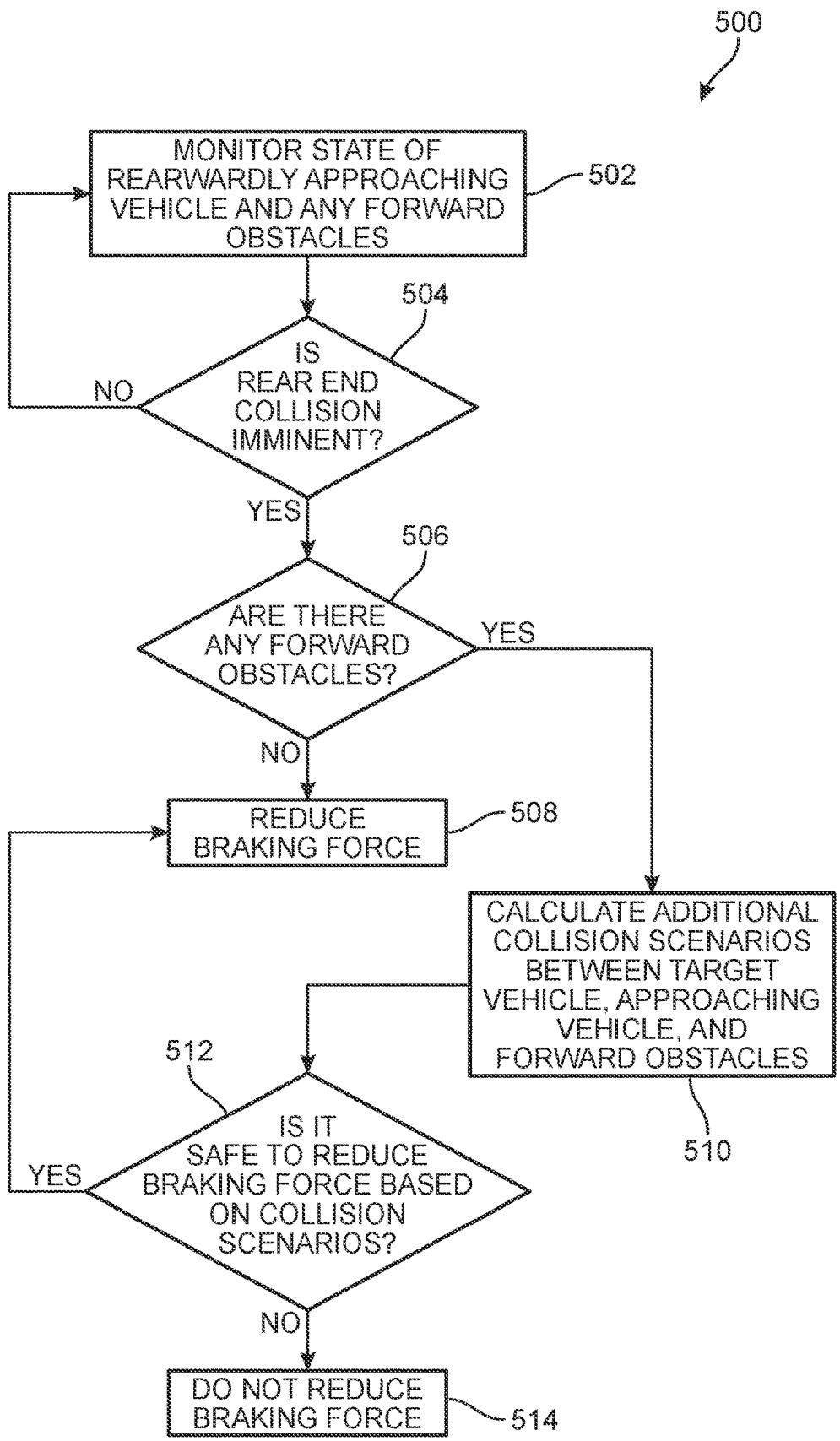
FIG. 5 is a schematic view of a process for adjusting a vehicle braking system prior to an imminent collision, according to an embodiment.

FIG. 5 is a schematic view of a process 500 for automatically reducing braking forces in a vehicle upon detecting that a rear-end collision with another vehicle is imminent. In some embodiments, one of more of the following steps could be performed by a collision adjustment system (such as system 120 of FIG. 1) in cooperation with other vehicle systems.

Starting in step 502, system 120 may monitor the state of any approaching vehicles. Specifically, the system monitors vehicles approaching from behind the vehicle. The state of the approaching vehicle could include the location and/or relative distance of the approaching vehicle, the speed of the approaching vehicle, current acceleration of the approaching vehicle, information about braking distance (or time) for the approaching vehicle, information about any active collision avoidance systems in the approaching vehicle that may act to stop the vehicle prior to a collision, and/or information about the state of the driver of the approaching vehicle (for example, whether or not the driver appears distracted).

The state of the approaching vehicle could be monitored using onboard vehicle sensors and/or by communicating with any adjacent vehicles, including the approaching vehicle itself. For example, the distance, speed and/or acceleration of the approaching vehicle could be automatically detected using a rearward facing LIDAR device, radar, or other instruments that can detect the speed of an approaching vehicle. Braking distance for the vehicle (that is, how far the vehicle would travel before stopping if full braking force were immediately applied) and/or information about any active collision avoidance systems could be inferred by detecting the make and/or model of the vehicle (using onboard cameras and suitable machine vision algorithms) and retrieving stored information for braking times of different vehicles. In some cases, various state information could be received directly from the approaching vehicle using, for example, vehicle-to-vehicle communications.

In some embodiments, during step 502, system 120 may also detect any forward obstacles that are located in front of the target vehicle.

Next, in step 504, system 120 can determine if a rear-end collision is imminent, or substantially unavoidable. As used herein, the term "substantially unavoidable" means that, according to the system's calculations, a rear-end collision is highly likely with a very high confidence level. Further discussion of this process of determining the likelihood of a collision is discussed in further detail below and shown in FIG. 9.

If the system determines that a rear-end collision is imminent, the system may proceed to step 506. Otherwise, the system proceeds back to step 502 to continue monitoring the state of any approaching vehicles as well as detecting forward obstacles.

In step 506, system 120 determines if there are any forward obstacles. More specifically, in some cases, system 120 determines if there are any forward obstacles that might be problematic during a collision with the approaching vehicle. As an example, if the target vehicle is stopped at an intersection and another vehicle or pedestrian is immediately in front of the target vehicle prior to a rear end collision, the vehicle or pedestrian could be a problematic obstacle during a collision, since the target vehicle could be pushed into the vehicle of pedestrian.

If there are no forward obstacles (of considerable concern), the system proceeds to step 508, where it automatically reduces the braking force for the target vehicle. In some cases, if the system determines that a collision is imminent, the brakes may be completely released, so that no braking forces are applied to the wheels. In other cases, the system could reduce the braking force by an amount that depends on suitable factors, such as the speed of the approaching vehicle at impact.

If forward obstacles are detected in step 506, system 120 may proceed to step 510 to calculate additional collision scenarios between the target vehicle, an approaching vehicle, and any forward obstacles detected by the target vehicle.

Based on the various collision scenarios calculated in step 510, system 120 may determine if it is safe to reduce the braking force of the target vehicle. For example, if the majority of the additional collision scenarios predict that, if the braking force of the target vehicle is released, the target vehicle may be thrown into a pedestrian during a rear end impact, then the system may determine it is not safe to reduce the braking force.

If system 120 determines that it is safe to reduce the braking force, system 120 proceeds to step 508 to reduce the braking force of the target vehicle. Otherwise, if the system determines it is not safe to reduce the braking force, system 120 proceeds to step 514, where the braking force is not reduced.

Braking force adjustments could be performed using braking control system 302 (see FIG. 3). It may be appreciated that the braking force can be automatically adjusted without the driver adjusting the physical position of the brake pedal.

Generally, this process may be applied when a vehicle is stationary and/or moving sufficiently slowly with some braking force already being applied. In some cases, prior to performing the steps shown in FIG. 5, system 120 could detect that the vehicle is stationary or moving sufficiently slowly such that rear-end collisions are a possible concern.

Figure 6:
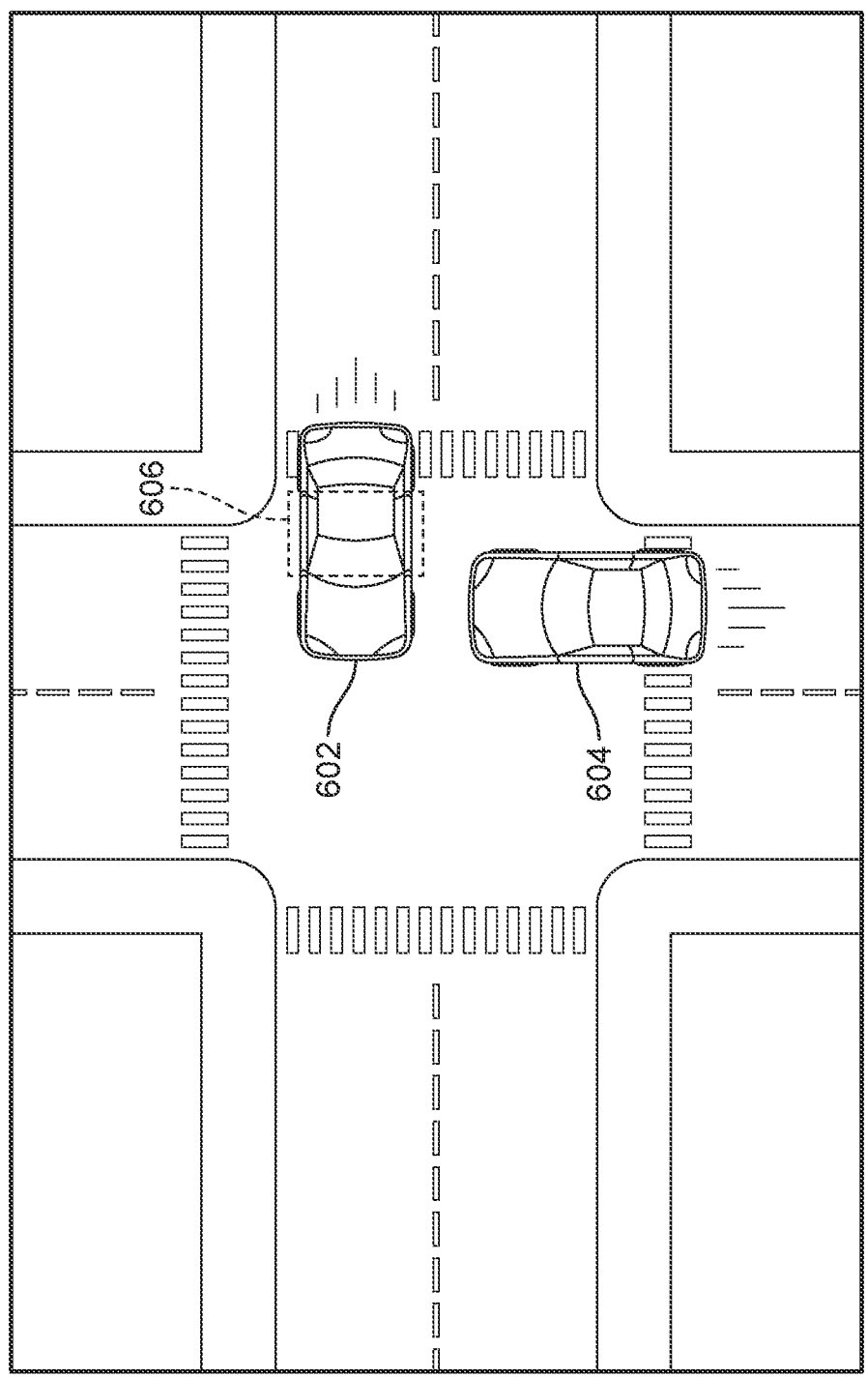
FIG. 6 is a schematic view of a scenario in which a target vehicle may be hit by an approaching vehicle along the side of the target vehicle, according to an embodiment.

FIG. 6 is a schematic view of another scenario where a collision avoidance system could be used. In FIG. 6, an approaching vehicle 604 is about to collide with a target vehicle 602. Specifically, approaching vehicle 604 is about to collide with a passenger region 606 of target vehicle 602, which includes the doors adjacent the passenger cabin. This would result in a side impact collision (also known as a "T-Bone" collision).

To improve safety and reduce danger to passengers during a side impact collision that is unavoidable, a collision avoidance system can take actions to adjust the impact location on the vehicle. During a side impact collision, for example, it may be preferable to change the impact location from a passenger region (associated with the passenger cabin and vehicle doors) to another region, such as the trunk. For example, in FIG. 7, target vehicle 602 accelerates, automatically, so that at the time of impact, approaching vehicle 604 collides with a rearward end region 702 (that is, trunk) of target vehicle 602. Simultaneously, in the example in FIG. 7, target vehicle 602 automatically turns to the right and away from the approaching vehicle, which also tends to present the trunk for impact, rather than the passenger region of the target vehicle. Using this configuration, the impact will occur at the rearmost end of the vehicle and will be directed away from the passenger cabin of the vehicle.

Figure 8:
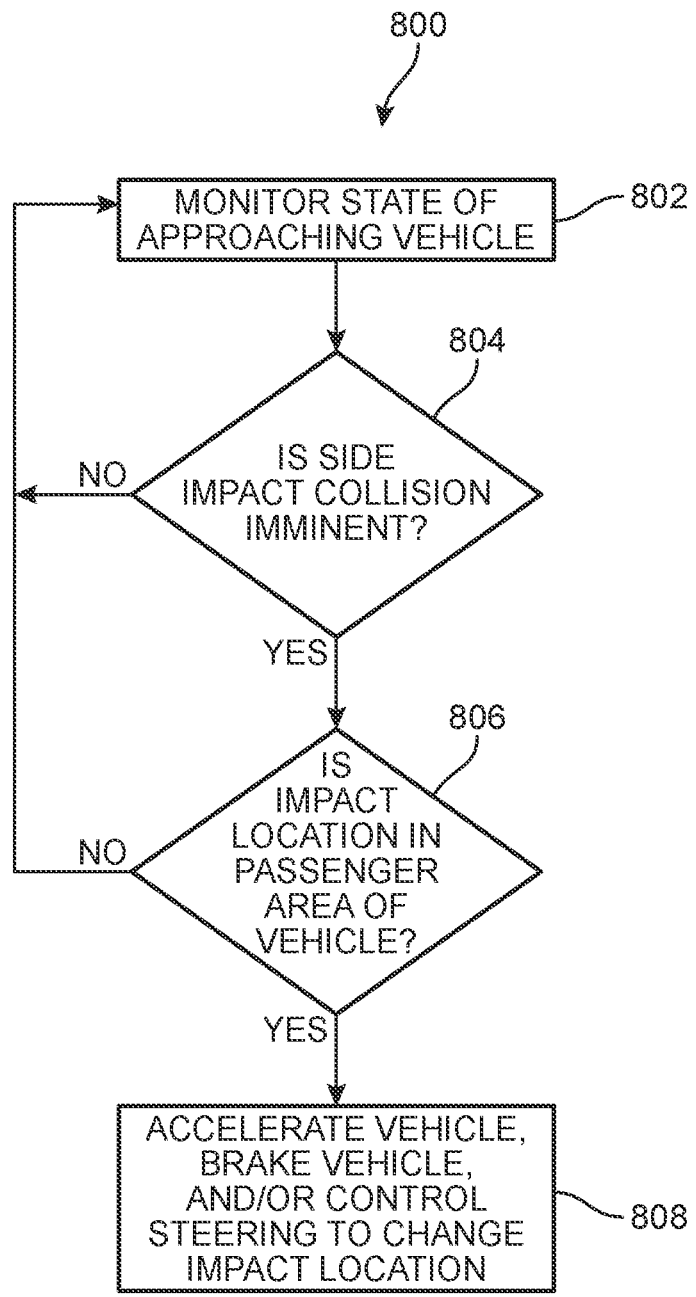
FIG. 8 is a schematic view of a process for adjusting one or more vehicle systems in response to an imminent collision, according to an embodiment.

FIG. 8 is a schematic view of a process 800 for automatically accelerating a vehicle upon detecting that a side impact collision with another vehicle is imminent. In some embodiments, one or more of the following steps could be performed by a collision adjustment system (such as system 120 of FIG. 1) in cooperation with other vehicle systems.

Starting in step 802, system 120 may monitor the state of any approaching vehicles. Specifically, the system monitors vehicles approaching from the sides of the vehicle. The state of the approaching vehicle could include the location and/or relative distance of the approaching vehicle, the speed of the approaching vehicle, current acceleration of the approaching vehicle, information about braking distance (or time) for the vehicle, information about any active collision avoidance systems in the approaching vehicle that may act to stop the vehicle prior to a collision, and/or information about the state of the driver of the approaching vehicle (for example, whether or not the driver appears distracted).

The state of the approaching vehicle could be monitored using onboard vehicle sensors and/or by communicating with any adjacent vehicles, including the approaching vehicle itself. For example, the distance, speed and/or acceleration of the approaching vehicle could be automatically detected using a side facing LIDAR device, radar, or other instruments that can detect the speed of an approaching vehicle. Braking distance for the vehicle (that is, how far the vehicle would travel before stopping if full braking force were immediately applied) and/or information about any active collision avoidance systems could be inferred by detecting the make and/or model of the vehicle (using cameras) and retrieving stored information for braking times of different vehicles. In some cases, various state information could be received directly from the approaching vehicle using, for example, vehicle-to-vehicle communications.

Next, in step 804, system 120 can determine if a side impact collision is imminent. This process may include estimating a range of possible and/or likely trajectories for the approaching vehicle using any of the state information received in step 802. Furthermore, once a range of possible and/or likely trajectories are determined, the system can check to see if a collision is substantially unavoidable. For example, the system could determine the current distance between the vehicles is already less than the minimum braking distance for the approaching vehicle at that moment. In such a situation the system may determine that a side impact collision is imminent/unavoidable.

If the system determines that a side impact collision is imminent, the system may proceed to step 806. Otherwise, the system proceeds back to step 802 to continue monitoring the state of any approaching vehicles.

In step 806, the system determines if the impact location is in the passenger area of the vehicle. In some cases, the system can calculate the current trajectories of each vehicle and consider their intersection in order to predict the likely impact location.

In step 808, system 120 may take one or more actions to adjust the likely impact location between the target vehicle and the approaching vehicle. In some cases, system 120 may automatically accelerate the target vehicle to change the impact location between the target vehicle and the approaching vehicle. Specifically, the target vehicle may be accelerated so that the approaching vehicle impacts the rear-end of the target vehicle, and avoids an impact location at the passenger cabin. This may be accomplished using electronic throttle control 304 (see FIG. 3), for example.

Alternatively, depending on the relative speeds of the vehicles and expected impact area, a collision avoidance system could automatically brake a vehicle in response to determining a side-on collision is imminent. In this case, immediately braking the vehicle may present the front end (or hood) of the vehicle for impact with the approaching vehicle. As with the scenario discussed above, this would shift the impact to a location that is away from the passenger cabin. In some cases, automatic braking could be implemented using braking control system 302.

Another option available to system 120 is to control the steering of the target vehicle to change an impact location. For example, in the example shown in FIG. 6, to avoid an impact location at the passenger cabin, system 120 could automatically modify the vehicle steering to turn the target vehicle away from the approaching vehicle. As the target vehicle is turned, the rear-end is presented to the approaching vehicle, which may result in the approaching vehicle impacting the rear-end, or colliding with the target vehicle at an oblique angle that is less dangerous than a full side impact collision at the passenger cabin. The steering could be automatically controlled using steering system 306.

Figure 7:
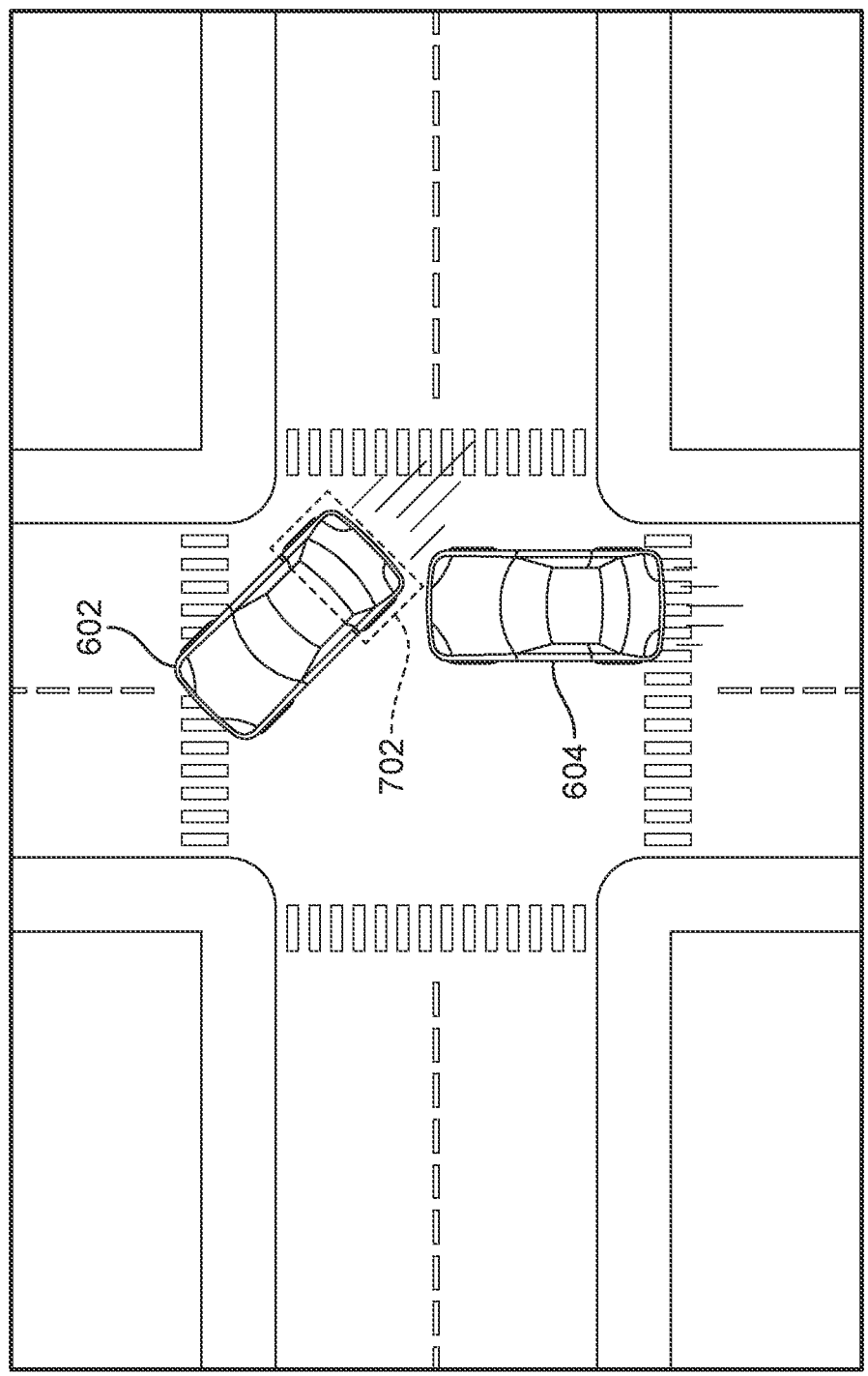
FIG. 7 is a schematic view of the target vehicle responding to an imminent collision with the approaching vehicle by suddenly accelerating and turning to change the impact location, according to an embodiment.

As already demonstrated in the example shown in FIG. 7, both turning and acceleration could be applied simultaneously, thereby shifting the impact location towards the trunk and simultaneously presenting more of the trunk (and thereby, less of the side) for impact with the approaching vehicle.

Figure 9:
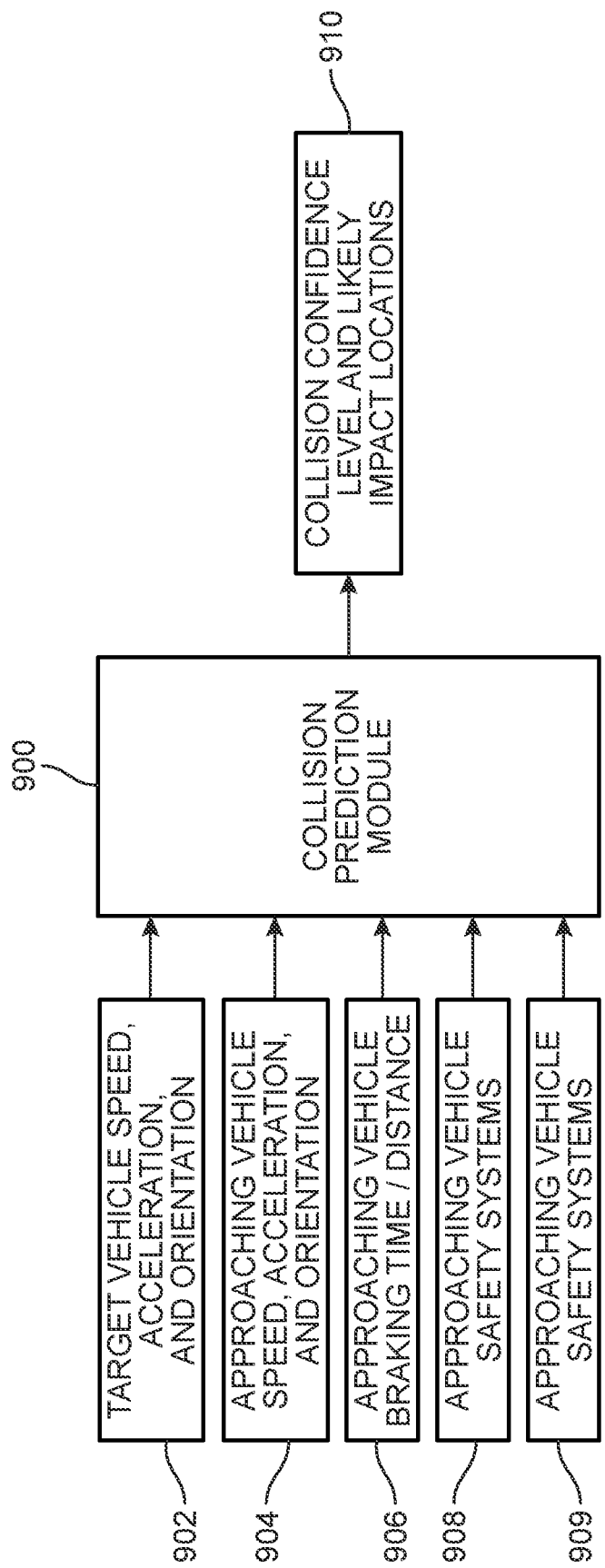
FIG. 9 is a schematic view of a collision prediction module, according to an embodiment.

FIG. 9 is a schematic view of a collision prediction module 900. Collision prediction module 900 may be used to determine if a collision is substantially unavoidable. As seen in FIG. 9, various inputs could be used to make a collision prediction. These inputs may include target vehicle speed, acceleration and orientation (input 902), approaching vehicle speed, acceleration and orientation (input 904), approaching vehicle braking time or distance (input 906), as well as any information about any vehicle safety systems used by the approaching vehicle (input 908).

In some cases, further inputs could include the state of a driver in an approaching vehicle (input 909). The state of the driver could be inferred using cameras and applying machine learning to images of the driver in the approaching vehicle, and/or by receiving information through a vehicle-to-vehicle communication system from the onboard systems of the approaching vehicle. A distracted driver may indicate that there is a higher probability of a collision, especially if there are no active collision avoidance systems in the approaching vehicle, such as an automatic braking system.

Outputs to the module could include a collision confidence level and likely impact locations along the target vehicle (output 910).

At the level of an algorithm, calculating a collision confidence level may include calculating many different collision scenarios with a range of input parameters (such as vehicle positions, speeds, and orientations) and determining that a high percentage (that is, above some threshold level, such as 90% or 99%) result in a collision. In some cases, determining if a collision is substantially unavoidable could include applying a set of input parameters (such as vehicle positions, speeds, and orientations) into a machine learning algorithm (such as a neural network) that has been trained to identify scenarios where collisions are highly likely. Other factors could also be used to determine if a collision is imminent. For example, if the minimum braking distance for the approaching vehicle is known, or can be inferred, the system could determine that the minimum braking distance for the approaching vehicle to stop is already greater than the current distance between the vehicle and the approaching vehicle. In such a situation the system may determine that a rear-end collision or side impact collision is imminent/unavoidable.

It may be appreciated that a collision adjustment system may be configured to react in response to imminent rear-end collisions and side impact collisions. That is, the same system can detect vehicles approaching from behind, and from the side, and take the disclosed actions to avoid rear-end collisions or side impact collisions.

Moreover, the principles described herein are not limited to use with rear-end collisions or side impact collisions, and could be applied to other kinds of collisions.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of adjusting a vehicle braking system in a target vehicle, the target vehicle further including a collision adjustment system, the method comprising:
receiving, at the collision adjustment system, information about an approaching vehicle from one or more vehicle sensors, wherein the information about the approaching vehicle includes at least an approaching vehicle speed and an approaching vehicle orientation;
receiving, at the collision adjustment system, information about any forward obstacles to the target vehicle;
determining, from the information about the approaching vehicle, if a rear-end collision between the approaching vehicle and the target vehicle is substantially unavoidable by:
assessing a state of a driver in the approaching vehicle; and
determining if the driver is distracted;
determining if there are any forward obstacles to the target vehicle; and
upon determining that a rear-end collision is substantially unavoidable between the target vehicle and the approaching vehicle, and that there are no forward obstacles to the target vehicle, the method further comprises automatically decreasing the braking force being applied by the vehicle braking system.

2. The method according to claim 1, wherein determining that the rear-end collision is substantially unavoidable further includes predicting a future vehicle trajectory for the approaching vehicle and determining if the future vehicle trajectory intersects a current location of the target vehicle.

3. The method according to claim 2, wherein predicting the future vehicle trajectory includes retrieving information about a minimum vehicle braking distance for the approaching vehicle, the minimum vehicle braking distance being a minimum distance that the approaching vehicle would travel if full braking force were applied immediately.

4. The method according to claim 2, wherein predicting the future vehicle trajectory includes retrieving information about whether the approaching vehicle has an automated braking system.

5. The method according to claim 1, wherein upon determining that there are forward obstacles, the method further includes:
calculating additional collision scenarios between target vehicle, the approaching vehicle and forward obstacles, and
determining if it is safe to decrease the braking force according to the calculated additional collision scenarios.

6. The method according to claim 5, wherein upon determining that it is safe to decrease the braking force the method further comprises decreasing the braking force being applied by the vehicle braking system.

7. The method according to claim 5, wherein upon determining that it is not safe to decrease the braking force, the method further comprises maintaining the braking force being applied by the vehicle braking system.

8. The method according to claim 1, wherein assessing the state of the driving includes receiving images of the driver of the approaching vehicle.

9. The method according to claim 8, wherein assessing the state of the driver further includes applying machine learning to the images of the driver of the approaching vehicle.

10. A vehicle control system comprising:
a processor; and
memory storing instructions that are executable by the processor to:
receive information about an approaching vehicle from one or more vehicle sensors;
determine, from the information about the approaching vehicle, if a side impact collision between the approaching vehicle and the target vehicle is substantially unavoidable and determining a predicted impact location;
determine if the predicted impact location is associated with a passenger area of the target vehicle;
determine that the side impact collision is substantially unavoidable between the target vehicle and the approaching vehicle, and that the predicted impact location is associated with the passenger area of the target vehicle; and
automatically turn the target vehicle away from the approaching vehicle and simultaneously accelerate the target vehicle.

11. The vehicle control system according to claim 10, wherein one or more vehicle sensors includes a camera.

12. The vehicle control system according to claim 10, wherein the instructions are further executable by the processor to determine if a side impact collision is substantially unavoidable by predicting a future vehicle trajectory for the approaching vehicle and determining if the future vehicle trajectory intersects a current location of the target vehicle.

13. The vehicle control system according to claim 12, wherein predicting the future vehicle trajectory includes retrieving information about whether the approaching vehicle has an automated braking system.

14. The vehicle control system according to claim 10, wherein the instructions are further executable by the processor to determine if a side impact collision is substantially unavoidable by retrieving information about a minimum vehicle braking distance for the approaching vehicle, the minimum vehicle braking distance being a minimum distance that the approaching vehicle would travel if full braking force were applied immediately.

15. A method of adjusting one or more vehicle control systems in a target vehicle, the target vehicle further including a collision adjustment system, the method comprising:
  receiving, at the collision adjustment system, information about an approaching vehicle from one or more vehicle sensors;
  determining, from the information about the approaching vehicle, if a side impact collision between the approaching vehicle and the target vehicle is substantially unavoidable and determining a predicted impact location;
  determining if the predicted impact location is associated with a passenger area of the target vehicle;
  upon determining that the side impact collision is substantially unavoidable between the target vehicle and the approaching vehicle, and that the predicted impact location is associated with the passenger area of the target vehicle, the method further comprises automatically turning the target vehicle away from the approaching vehicle and simultaneously accelerating the target vehicle.

16. The method according to claim 15, wherein the impact location is a passenger area of the target vehicle.

17. The method according to claim 15, wherein turning the target vehicle away from the approaching vehicle changes a collision angle between the vehicles.

18. The method according to claim 15, wherein determining if the side impact collision is substantially unavoidable further includes predicting a future vehicle trajectory for the approaching vehicle and determining if the future vehicle trajectory intersects a current location of the target vehicle.

19. The method according to claim 18, wherein predicting the future vehicle trajectory includes retrieving information about whether the approaching vehicle has an automated braking system.

20. The method according to claim 15, wherein determining if the side impact collision between the approaching vehicle and the target vehicle is substantially unavoidable includes retrieving information about a minimum vehicle braking distance for the approaching vehicle, the minimum vehicle braking distance being a minimum distance that the approaching vehicle would travel if full braking force were applied immediately.

* * * * *